(12) United States Patent
Jang et al.

(10) Patent No.: US 8,115,805 B2
(45) Date of Patent: Feb. 14, 2012

(54) STEREOSCOPIC IMAGE DISPLAY DEVICE AND METHOD FOR DRIVING THE SAME

(75) Inventors: Hyoung-Wook Jang, Suwon-si (KR); Jang-Doo Lee, Suwon-si (KR); Hui Nam, Suwon-si (KR); Beom-Shik Kim, Suwon-si (KR); Myoung-Seop Song, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 1386 days.

(21) Appl. No.: 11/065,212

(22) Filed: Feb. 24, 2005

(65) Prior Publication Data

US 2005/0185275 A1   Aug. 25, 2005

(30) Foreign Application Priority Data

Feb. 25, 2004 (KR) .................... 10-2004-0012619

(51) Int. Cl.
*H04N 13/04* (2006.01)
(52) U.S. Cl. ............ 348/55; 348/51; 348/42; 345/87; 359/464
(58) Field of Classification Search .............. 348/55, 348/51, 42; 345/87; 359/464
See application file for complete search history.

(56) References Cited

U.S. PATENT DOCUMENTS

| | | | |
|---|---|---|---|
| 5,315,377 A | 5/1994 | Isono et al. | |
| 5,825,541 A | 10/1998 | Imai | |
| 5,949,390 A | 9/1999 | Nomura et al. | |
| 6,108,029 A | 8/2000 | Lo | |
| 6,649,914 B1 * | 11/2003 | Moorman et al. | 250/363.06 |
| 2002/0024592 A1 * | 2/2002 | Uomori et al. | 348/42 |
| 2002/0114072 A1 * | 8/2002 | Hong | 359/464 |
| 2003/0025659 A1 * | 2/2003 | Kondo et al. | 345/87 |
| 2003/0067539 A1 | 4/2003 | Doerfel et al. | |
| 2003/0203747 A1 | 10/2003 | Nagamine | |
| 2006/0152812 A1 | 7/2006 | Woodgate et al. | |

FOREIGN PATENT DOCUMENTS

DE   200 22 456 U1   11/2001

(Continued)

OTHER PUBLICATIONS

Patent Abstracts of Japan for Publication No. 08-327948, date of publication of Dec. 13, 1996, in the name of inventor T. Taniguchi.

(Continued)

*Primary Examiner* — Jay Au
*Assistant Examiner* — James Pontius
(74) *Attorney, Agent, or Firm* — Christie, Parker & Hale, LLP

(57) ABSTRACT

A stereoscopic image display that displays a stereoscopic image using a barrier operated by a time division method. A display panel time-divides first and second images having parallax therebetween and sequentially displays the first and second images. A barrier is located in front of the display panel and includes first and second image transmission regions transmitting the first and second images. A barrier driver controls opening and shutting of the first and second image transmission regions in synchronization with first and second video signals input thereto. The barrier driver extracts all video signals displayed on one picture from the input video signals as unit video signals and generates a reference signal for the barrier operation based on the unit video signals.

13 Claims, 3 Drawing Sheets

FOREIGN PATENT DOCUMENTS

| | | |
|---|---|---|
| EP | 0 833 183 A1 | 4/1998 |
| EP | 1 357 726 A1 | 10/2003 |
| JP | 03-119889 | 5/1991 |
| JP | 4-250439 | 9/1992 |
| JP | 8-327948 | 12/1996 |
| JP | 09-159970 | 6/1997 |
| JP | 9-171156 | 6/1997 |
| JP | 10-142572 | 5/1998 |
| JP | 2001-197523 | 7/2001 |
| JP | 2002-95015 | 3/2002 |
| JP | 2004-297607 | 10/2004 |
| JP | 2005-172925 | 6/2005 |
| KR | 1999-0053446 | 7/1999 |
| KR | 2002-0041382 | 6/2002 |
| KR | 2003-0021293 | 3/2003 |
| KR | 2003-0088244 | 11/2003 |
| WO | WO 00/70882 | 11/2000 |

OTHER PUBLICATIONS

Patent Abstracts of Japan, Publication No. 09-171156, dated Jun. 30, 1997, in the name of Tetsuya Tateno.

Korean Patent Abstracts, Publication No. 1020030088244 A, dated Nov. 19, 2003, in the name of Hyeong Uk Jang, et al.

Patent Abstracts of Japan, Publication No. 04-250439; Date of Publication: Sep. 7, 1992; in the name of Mikio Sakamoto.

Patent Abstracts of Japan, Publication No. 2002-095015; Date of Publication: Mar. 29, 2002; in the name of Akihiro Fujiwara et al.

Patent Abstracts of Japan, Publication No. 2005-172925; Date of Publication: Jun. 30, 2005; in the name of Shiki Takabayashi et al.

European Search Report dated Jan. 3, 2006, for European Application 05110066.8, indicating relevance of listed foreign references in this IDS (except for Japan and Korea).

U.S. Office action dated Oct. 30, 2008, for related U.S. Appl. No. 11/274,831, indicating relevance of listed U.S. references in this IDS (except for 5,949,390 and 2003/0067539).

Patent Abstracts of Japan, Publication No. 10-142572, dated May 29, 1998, in the name of Jonathan Harrold et al.

Korean Patent Abstracts, Publication No. 100274625, dated Sep. 14, 2000, in the name of Geon Ho Cho et al., which corresponds to Korean Publication 1999-0053446 listed above.

Korean Patent Abstracts, Publication No. 1020020041382, dated Jun. 1, 2002, in the name of Seong Jung Lee.

Korean Patent Abstracts, Publication No. 1020030021293, dated Mar. 15, 2003, in the name of Hee Bin Lim.

U.S. Office action dated Sep. 18, 2009, for related U.S. Appl. No. 11/274,831, noting listed reference in this IDS.

* cited by examiner

A

B

C $D_1$ $D_2$

STEREOSCOPIC IMAGE DISPLAY DEVICE AND METHOD FOR DRIVING THE SAME

CROSS REFERENCE TO RELATED APPLICATION

This application claims priority to and the benefit of Korean Patent Application No. 10-2004-0012619 filed on Feb. 25, 2004 in the Korean Intellectual Property Office, the entire content of which is incorporated herein by reference.

BACKGROUND OF THE INVENTION

1. Field of the Invention

The present invention relates to a stereoscopic image display device and a method for driving the same. More specifically, the present invention relates to a stereoscopic image display device that displays a stereoscopic image using a liquid crystal (LC) display panel employing a color field sequential method and an LC barrier, and a method for driving the display device.

2. Description of the Related Art

In general, people perceive a cubic effect physiologically and experientially. In three-dimensional image display technology, a cubic effect of an object is felt using binocular parallax, which is a primary factor in recognizing a cubic effect at a short distance.

Stereoscopic images are viewed using methods involving wearing glasses and methods involving not wearing glasses. The methods involving wearing glasses include an anaglyph method of wearing blue and red colored glasses respectively for both eyes, a polarization method of wearing polarized glasses having different polarization directions respectively for both eyes, and a time division method of periodically repeating a time-divided image and wearing glasses including an electronic shutter synchronized with the period of the time-divided image. However, with the method involving wearing glasses, it is inconvenient for a user to wear the glasses and the user has difficulty in seeing objects other than stereoscopic images. Accordingly, methods involving not wearing glasses have been actively studied recently.

Typical methods involving not wearing glasses include a lenticular method that locates a lenticular lens plate, which is constructed such that a cylindrical lens array is vertically arranged in front of an image panel, and a barrier method that separates left-eye and right-eye images from each other using a barrier to obtain a cubic effect.

FIG. 1 shows a conventional stereoscopic image display device using the barrier method. The stereoscopic image display device 10 includes an image panel 13 and a barrier 11. The barrier 11 having an opaque region 11-1 and a transparent region 11-2, which are repeatedly arranged, is located in front of the image panel 13. The image panel 13 includes a right-eye pixel 13-1 and a left-eye pixel 13-2. An observer sees an image displayed on the image panel 13 through the transparent region 11-2 of the barrier 11. The left eye 15 and right eye 14 of the observer respectively see different regions of the image panel 13 even through the same transparent region 11-2. That is, the observer perceives a cubic effect such that his left and right eyes 15, 13 see images displayed on adjacent pixels through the transparent region 11-2.

A technique in which left-eye and right-eye images are respectively displayed on left-eye and right-eye regions of the image panel and the observer simultaneously sees the left-eye and right-eye images through slits of the barrier is called a space division barrier method. The space division barrier method must display the left-eye and right-eye images simultaneously. That is, the space division barrier method has a difficulty in simultaneously displaying different images on adjacent pixels of the image panel.

Further, a stereoscopic image display device, which uses an LC display panel driven by a color field sequential method that sequentially time-division-displays red, green, blue (RGB) images at a high speed to use afterimages of eyes and allows an observer to recognize a color image, requires a device capable of stably time-division-displaying left-eye and right-eye images in synchronization with time-division display of each single-color image.

SUMMARY OF THE INVENTION

In accordance with the present invention a stereoscopic image display device for displaying a stereoscopic image using a barrier driven according to a time division method is provided.

In one aspect of the present invention, a stereoscopic image display device includes a display panel for time-dividing first and second images having parallax between them and sequentially displaying the first and second images. A barrier that is located in front of the display panel includes a first image transmission region transmitting the first image and a second image transmission region transmitting the second image. A barrier driver controls opening and shutting of the first and second image transmission regions in synchronization with first and second input video signals.

The display panel can be an LC display driven by a color filter sequential method.

The barrier driver can include a video signal input unit for buffering a video signal input from an external device. A reference signal generator extracts all video signals corresponding to one displayed picture from the input video signal as unit video signals and generates a reference signal for the barrier operation based on the unit video signals. A barrier driving signal generator generates a driving signal for controlling opening and shutting of the first image transmission region and a driving signal for controlling opening and shutting of the second image transmission region based on the reference signal.

The reference signal generator can include a low pass filter for filtering low-frequency components of the input video signal to extract the unit video signals, and a comparator for generating the reference signal having a pulse waveform from the extracted unit video signals.

The driving signal for controlling opening and shutting of the second image transmission region can be an inverted signal of the driving signal for controlling opening and shutting of the first image transmission region.

The barrier can include an LC shutter having the first and second image transmission regions that are on/off based on the driving signals generated by the barrier driving signal generator.

In another aspect of the present invention, a method for driving a stereoscopic image display device that displays a stereoscopic image using a barrier including a first image transmission region transmitting a first image and a second image transmission region transmitting a second image having parallax with the first image includes: forming input video signals for displaying the first image as a first signal and forming input video signals for displaying the second image as a second signal, and opening the first image transmission region based on the first signal and opening the second image transmission region based on the second signal.

The input video signals can be formed as the first or second signal using a low pass filter.

The second signal can be an inverted signal of the first signal.

DETAILED DESCRIPTION

Figure 1:
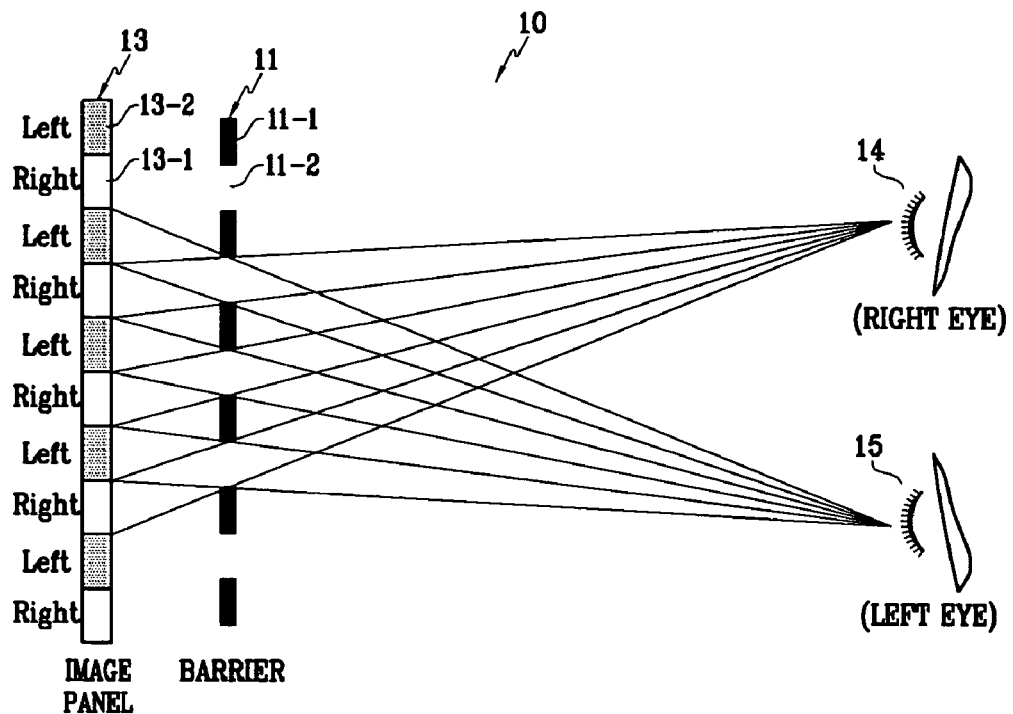
FIG. 1 shows a conventional stereoscopic image display device using a barrier method.
Figure 2:
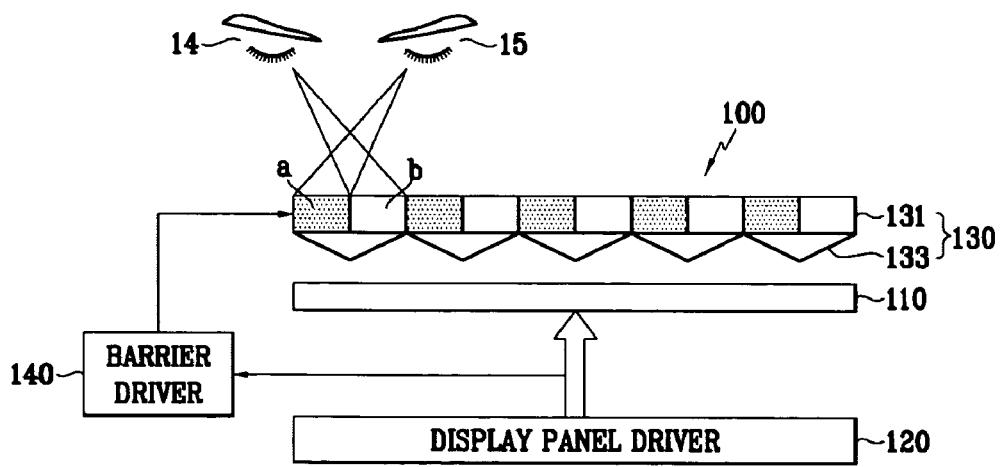
FIG. 2 shows the construction of a stereoscopic image display device 100 according to an embodiment of the present invention.

Referring to FIG. 2, the stereoscopic image display device 100 is a time division stereoscopic display device. The stereoscopic image display device 100 does not simultaneously display left-eye and right-eye images on respective regions of an image panel, but time-divides the left-eye and right-eye images at a high speed and displays them. That is, the left-eye and right-eye images respectively recognized by left and right eyes are alternately shown to an observer at a high speed (60 Hz for each of the left-eye and right-eye images, for example) such that the observer perceives a cubic effect.

Specifically, the display device 100 includes an LC display driven by a color field sequential method (referred to as FS-LCD hereinafter) 110, a panel driver 120 for driving the FS-LCD, an LC shutter 131, and a prism 133. The FS-LCD 110 sequentially time-division-displays R, G, B images at a high speed to display a color picture. The panel driver 120 processes an input image and outputs a driving signal for time-division-displaying the R, G, B images at a high speed on the FS-LCD 110 and a driving signal for time-division-displaying left-eye and right-eye images to the FS-LCD 110.

A barrier 130 includes the LC shutter 131 and prism 133. The LC shutter 131 transmits or shuts off an image using the arrangement of LC molecules. Specifically, the molecule arrangement of the LC is varied with a voltage applied to the LC to generate birefringence, optical rotary power, dichroism, and light scattering. The LC shutter 131 transmits or shuts off an image using a light modulation operation. The LC shutter 131 includes a left-eye image transmission region a and a right-eye image transmission region b, which are alternately arranged. The regions a and b are opened or shut in response to a driving signal applied to the LC shutter 131. Accordingly, the observer sees left-eye and right-eye images that have passed the left-eye and right-eye image transmission regions a and b by his left and right eyes, respectively.

The barrier driver 140 generates the driving signals for controlling shutting and opening of the left-eye image transmission region a and right-eye image transmission region b of the LC shutter 131 based on the input image. That is, the barrier driver 140 is operated such that the left-eye image transmission region a of the LC shutter 131 is opened and the right-eye image transmission region b of the LC shutter 131 is shut to allow the left-eye image transmission region a to transmit the left-eye image when the left-eye image is displayed on the FS-LCD 110. Furthermore, the barrier driver 140 is operated such that the left-eye image transmission region a of the LC shutter 131 is shut and the right-eye image transmission region b of the LC shutter 131 is opened to allow the right-eye image transmission region b to transmit the right-eye image when the right-eye image is displayed on the FS-LCD 110.

Figure 3:
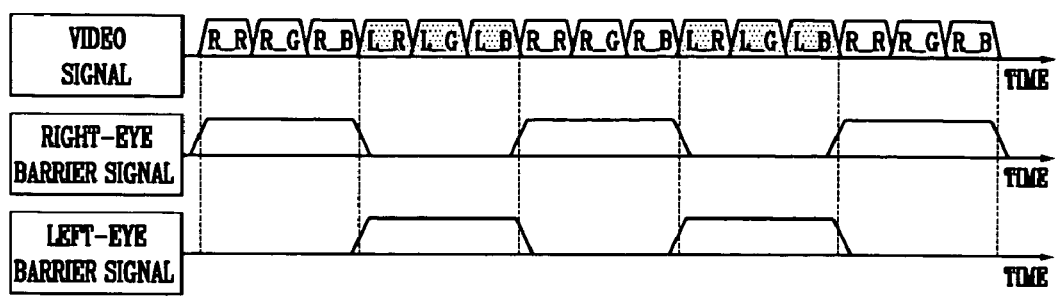
FIG. 3 is a timing diagram showing the relationship between an input video signal and barrier driving signals.

FIG. 3 is a timing diagram showing the relationship between an input video signal and barrier driving signals. The right-eye image transmission region b is opened and the left-eye image transmission region a is shut while RGB right-eye images R_R, R_G, and R_B are sequentially input and displayed. While RGB left-eye images L_R, L_G, and L_B are sequentially input and displayed, the right-eye image transmission region b is shut and the left-eye image transmission region a is opened.

Figure 4:
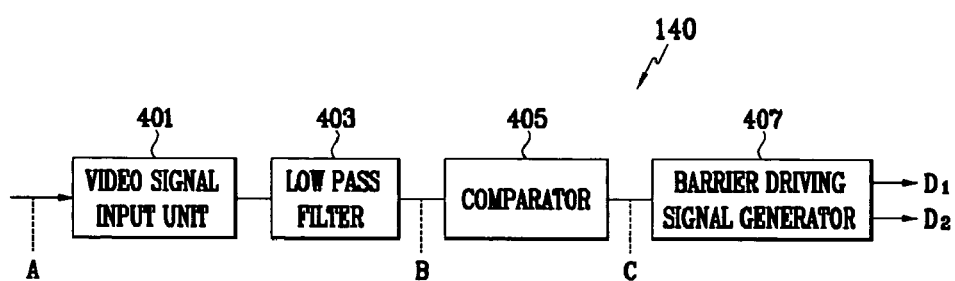
FIG. 4 shows the construction of a barrier driver according to an embodiment of the present invention.

FIG. 4 shows the construction of the barrier driver 140 according to an embodiment of the present invention. The barrier driver 140 includes a video signal input unit 401, a low pass filter 403, a comparator 405, and a barrier driving signal generator 407.

The video signal input unit 401 receives a left-eye video signal and a right-eye video signal input A from an external device and buffers the signals. The low pass filter 403 generates a reference signal B of the driving signals of the LC shutter. That is, the low pass filter 403 filters low-frequency components of the input video signals to extract all left-eye video signals and right-eye video signals corresponding to one picture as unit video signals.

More specifically, the low pass filter 403 filters only low-frequency components of video signals received from the video signal input unit 401 to generate signals capable of displaying video signals corresponding to one picture as specific unit images, for example, left-eye images and right-eye images.

The comparator 405 generates a pulse signal C from the signal extracted by the low pass filter 403. For instance, the comparator 405 outputs a high value when the signal input from the low pass filter 403 is higher than a specific value, and outputs a low value when the signal is lower than the specific value to generate the pulse signal. This pulse signal becomes a reference signal for driving the barrier.

The barrier driving signal generator 407 shifts high and low states of its output signal whenever the rising edge of the pulse signal generated by the comparator 405 is input to the barrier driving signal generator 407. That is, a right-eye signal at a high level (on signal) is output at the first rising edge and thus a left-eye signal at a low level (off signal) is output. The right-eye image transmission region b of the LC shutter 131 is opened and the left-eye image transmission region a is shut in response to the left-eye signal and the right-eye signal. At the following rising edge, the right-eye signal is shifted from a high level to a low level, and the left-eye signal is shifted from a low level to a high level. Accordingly, The right-eye image transmission region b of the LC shutter 131 is shut and the left-eye image transmission region a is opened in response to the left-eye signal and the right-eye signal.

Figure 5A:
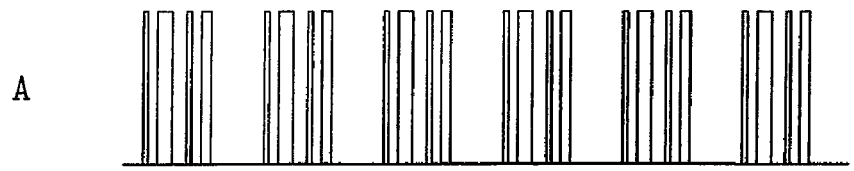
FIG. 5A shows waveforms of an input video signal.
Figure 5B:
FIG. 5B shows an output signal of a low pass filter.
Figure 5C:
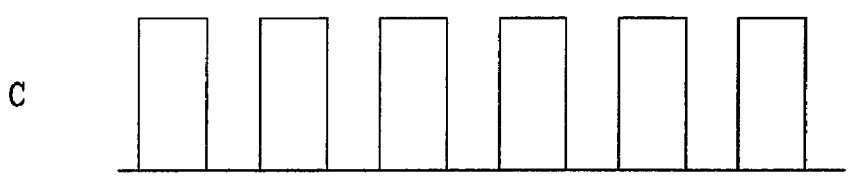
FIG. 5C shows an output signal of a comparator.
Figure 5D:
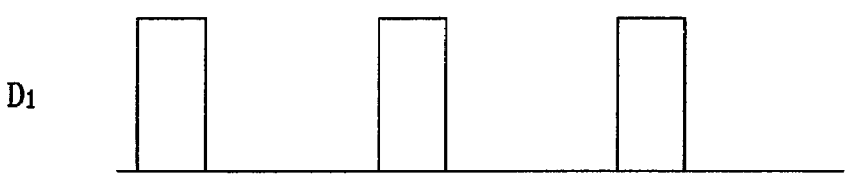
FIGS. 5D and 5E show output signals of a barrier driving signal generator.
Figure 5E:
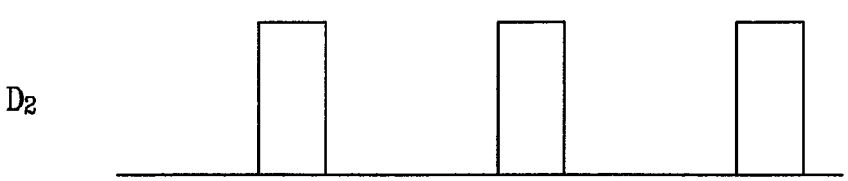

FIGS. 5A-5E respectively show waveforms of the input video signal A, the output signal of the low pass filter B, the output signal C of the comparator, and output signals $D_1$, $D_2$ of the barrier driving signal generator 407, as seen in FIG. 4. Low-frequency components of the input video signal (FIG. 5A) are filtered to generate the video signal (FIG. 5B) to be displayed as one picture, and the pulse signal (FIG. 5C) is generated from the video signal (FIG. 5B). Additionally, the right-eye signal and left-eye signal are generated in synchronization with the pulse signal (FIG. 5C).

As described above, the image that has passed the left-eye image transmission region is observed when the left-eye image is input and the image that has passed the right-eye image transmission region is observed when the right-eye image is input such that the observer perceives a cubic effect from continuously observed left and right images.

When ON/OFF of the left-eye image transmission region and right-eye image transmission region is controlled based on a vertical synchronous signal, the vertical synchronous signal might not correspond to a fixed vertical frequency in the display device. When the vertical synchronous signal does not correspond to the vertical frequency in the display device, a stereoscopic image is not synchronized with the barrier operation and thus the stereoscopic image cannot be properly displayed. When the barrier is operated in synchronization with the fixed vertical frequency, for instance, the operation of the barrier is not carried out so that a cubic effect cannot be obtained.

According to the present invention, however, the operation of the barrier is controlled in synchronization with a video signal in the time division stereoscopic image display device. Thus, stereoscopic moving pictures can be displayed irrespective of moving picture rates.

While the FS-LCD is used as an image panel in the embodiment of the present invention, a plasma display panel and a field emission display panel can be also used as the image panel. Furthermore, while the barrier has two viewing angles of the left-eye image and right-eye image in the embodiment of the present invention, the present invention also can be applied to a barrier having at least three viewing angles, which is operated such that at least three transmission regions are arranged and sequentially opened in a time division manner.

According to the present invention, the LC shutter of the barrier for displaying a stereoscopic image is driven in a time division manner based on a video signal to be displayed. Accordingly, the operation of the barrier, that is, operations of shutting and opening the left-eye image transmission region and right-eye image transmission region are controlled in synchronization with a video signal. Thus, all stereoscopic images can be effectively displayed without having distortion irrespective of a moving picture rate or the frequency of the video signal.

While this invention has been described in connection with what is presently considered to be the practical embodiments, it is to be understood that the invention is not limited to the disclosed embodiments, but, on the contrary, is intended to cover various modifications and equivalent arrangements included within the spirit and scope of the appended claims.

What is claimed is:

1. A stereoscopic image display device comprising:
   a display panel for displaying an image by time-dividing the image into a first image and a second image having parallax between them and sequentially displaying the first image and the second image;
   a barrier that is located in front of the display panel and includes a first image transmission region for transmitting the first image, and a second image transmission region for transmitting the second image; and
   a barrier driver for controlling opening and shutting of the first image transmission region and the second image transmission region in synchronization with first input video signals and second input video signals, the first input video signals corresponding to the first image and the second input video signals corresponding to the second image,
   wherein the barrier driver includes:
      a video signal input unit for buffering an input video signal from an external device,
      a reference signal generator for extracting all video signals corresponding to one displayed picture from the input video signal as unit video signals and generating a reference signal for operating the barrier based on the unit video signals, the reference signal being in synchronization with a timing for sequentially displaying the first image and the second image, the reference signal generator comprising a low pass filter for filtering low-frequency components of the input video signal to extract the unit video signals, and
      a barrier driving signal generator for generating a driving signal for controlling opening and shutting of the first image transmission region and a driving signal for controlling opening and shutting of the second image transmission region based on the reference signal.

2. The stereoscopic image display device as claimed in claim 1, wherein the display panel is a liquid crystal display driven by a color filter sequential method.

3. The stereoscopic image display device as claimed in claim 1, wherein the reference signal generator comprises:
   a comparator for generating the reference signal having a pulse waveform from the extracted unit video signals.

4. The stereoscopic image display device as claimed in claim 3, wherein the driving signal for controlling opening and shutting of the second image transmission region is an inverted signal of the driving signal for controlling opening and shutting of the first image transmission region.

5. The stereoscopic image display device as claimed in claim 1, wherein the barrier includes an LC shutter having the first image transmission region and the second image transmission region that are on/off based on the driving signal generated by the barrier driving signal generator.

6. A method for driving a stereoscopic image display device that displays a stereoscopic image using a barrier including a first image transmission region for transmitting a first image and a second image transmission region for transmitting a second image having parallax with the first image, the method comprising:
   forming first image input video signals for displaying the first image as a first signal and forming second image input video signals for displaying the second image as a second signal by filtering low frequency components of the first image input video signals and the second image input video signals by a low pass filter; and
   opening the first image transmission region based on the first signal and opening the second image transmission region based on the second signal for sequentially displaying the first image and the second image,
   wherein a timing of said opening the first image transmission region and said opening the second image transmission region is in synchronization with a timing of the first signal and the second signal for sequentially displaying the first image and the second image.

7. The method as claimed in claim 6, wherein the second signal is an inverted signal of the first signal.

8. A stereoscopic image display device comprising:
   a display panel adapted to be viewed by an observer having a left eye and a right eye;
   a display panel driver adapted to provide time-divided groups of sequential left eye signals representative of single-color images and sequential right eye signals representative of the single-color images to be displayed on the display panel;
   a barrier located between the display panel and the observer; and a barrier driver coupled to the barrier, the barrier driver adapted to drive the barrier to provide sequentially left-eye images and right-eye images in accordance with a reference signal that is time-division synchronized with a time-division display of corresponding groups of the single-color images, wherein the barrier driver comprises a low pass filter for extracting low-frequency components of left-eye video signals and right-eye video signals input from an external device, a frequency of the reference signal corresponding to the low frequency components.

9. The stereoscopic image display device of claim 8, wherein the barrier includes a shutter having a left-eye image transmission region and a right-eye image transmission region alternately arranged, the respective regions being opened or shut in response to a driving signal applied to the shutter.

10. The stereoscopic image display device of claim 8, wherein the display panel is a liquid crystal display panel and the panel driver processes an input image and outputs a driving signal for time-division-displaying red, green, and blue images on the liquid crystal display panel.

11. The stereoscopic image display device of claim 9, wherein the shutter is a liquid crystal shutter adapted to transmit or shut off an image by varying an arrangement of liquid crystal molecules.

12. The stereoscopic image display device of claim 8, wherein the barrier driver includes:
a video signal input unit adapted to receive the left-eye video signals and the right-eye video signals and buffer the left-eye video signals and the right-eye video signals;
a comparator responsive to the low-frequency components of the left-eye video signals and the right-eye video signals extracted by the low pass filter and adapted to generate a reference signal having a pulse waveform from the low-frequency components of the left-eye video signals and the right-eye video signals; and
a barrier driving signal generator responsive to the reference signal for driving the barrier.

13. The stereoscopic image display device of claim 8, wherein the display panel is selected from a liquid crystal display panel, a plasma display panel and field emission display panel.

* * * * *